Oct. 6, 1936.   A. L. LEPORE   2,056,578
BATTERY ELECTROLYTE LEVEL INDICATOR
Filed Aug. 6, 1934
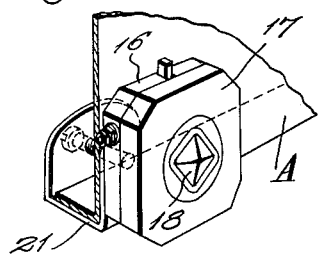
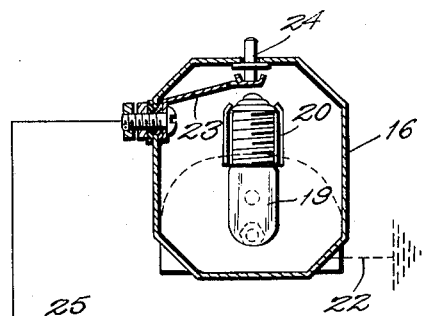
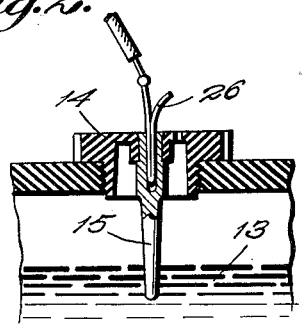
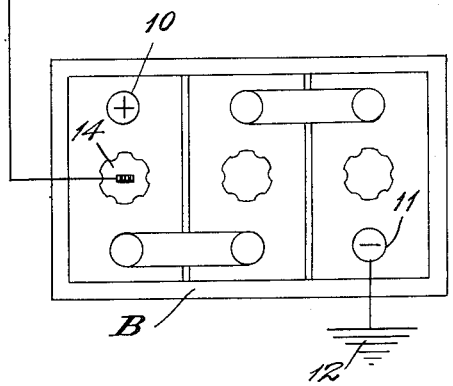
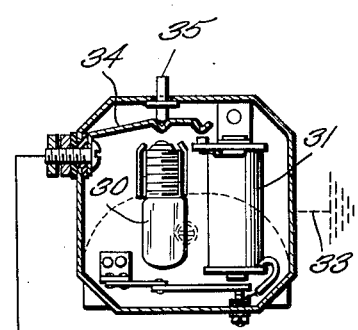
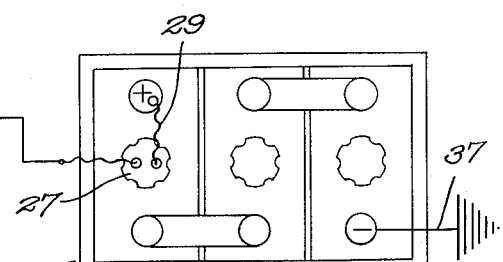
Alfred L. Lepore
INVENTOR
BY Victor J. Evans & Co.
ATTORNEY
WITNESS:

Patented Oct. 6, 1936

2,056,578

UNITED STATES PATENT OFFICE 2,056,578

BATTERY ELECTROLYTE LEVEL INDICATOR

Alfred L. Lepore, Providence, R. I., assignor of one-third to Charles Di Nuccio, Providence, R. I., and one-third to Union Trust Company, executor of the estate of Wilton H. Spencer, deceased Application August 6, 1934, Serial No. 738,747

1 Claim. (Cl. 177—311)

The invention relates to an indicator and more especially to an electric battery electrolyte level indicator.

The primary object of the invention is the provision of an indicator of this character, wherein through the use of an electric bulb or an electric bulb and buzzer arrangement adaptable for mounting upon the dash or instrument board of a motor vehicle, an indication may be had as to the predetermined level of electrolyte within a storage battery, and on the level receding from the proper height within the battery the indicator will serve to give knowledge of this fact, the indicator being of novel construction and readily and easily mountable within a motor vehicle in association with its storage battery without requiring any change or alteration either in the battery or in the fittings within the vehicle and such indicator may be located conveniently to the operator of the vehicle, so that it can be determined as to the condition of the electrolyte within the battery, thereby avoiding troublesome effort and time by inspecting the cells of the battery for determining the height or level of the electrolyte therein.

Another object of the invention is the provision of an indicator of this character which is simple in construction, thoroughly reliable and efficient in its operation, serving for telltale purposes as to the electrolyte level within the storage battery as within a motor vehicle, positive of working, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary perspective view of an instrument board or dash within a motor vehicle, showing applied thereto the indicator box for the indicator embodying the present invention.

Figure 2 is a fragmentary vertical sectional view through a battery cell showing the terminal anode and its connection with the indicator circuit.

Figure 3 is a sectional view through the indicator box showing diagrammatically the circuit layout between it and the storage battery within a motor vehicle.

Figure 4 is a view similar to Figure 3 showing a slight modification, the visible signal indicator being augmented by an audible indicator.

Figure 5 is a view similar to Figure 2 showing a double anode as arranged within a cell of the battery.

Similar reference characters indicate corresponding parts throughout the several views in the drawing.

Referring to the drawing in detail, particularly Figures 1 to 3 inclusive, A designates a portion of the instrument board or panel or dash within a motor vehicle and B the conventional type of storage battery as used within the vehicle having the positive post 10 and negative post 11, the latter being grounded at 12, as is usual, and within the battery B in each cell thereof is the electrolyte 13, it being introduced through a filling opening closed by a cap 14. To one of these caps is attached an anode or electrode 15 which extends within a cell of the battery B the required distance to meet the normal level of the electrolyte 13 within such cell.

Adapted to be carried by the panel or dash A is a lamp box or housing including the sections 16 and 17, respectively, these being detachably joined in matched relation to each other in any suitable manner, and in the section 17 is fitted a lens or light projecting glass 18. Arranged within the box or housing is an electric light bulb 19, it being held within a clip 20 therefor made fast to the body of said box or housing. The section 16 carries a clamp 21 which permits the detachable mounting of the box or housing upon the panel or dash A, as is clearly illustrated in Figure 1 of the drawing. On the lighting of the bulb 19, light will be projected through the glass or lens 18, so that a person can recognize this as a signal or indication. The box has the ground lead 22, while fitted within the box is a switch arm 23, this operable from a push button 24 and extending from this arm 23 is the light 25 having the releasable clip 26 for fitting within the anode 15. Thus it should be seen that when the switch 23 is closed an electric circuit is had between the battery and the bulb 19 provided that the anode 15 is in contact with the electrolyte 13 within the battery in that cell thereof in which projects the said anode 15, and in this fashion a person will have knowledge that the battery B carries a sufficient quantity of electrolyte or that the same is at the proper level within the battery. When the electrolyte 13 falls below the anode 15 it is impossible that the bulb 19 be lighted and, by this, knowledge will be had that the battery is lacking the necessary amount of electrolyte. The cells of the battery B are in electrical connection with each other when the requisite amount of electrolyte is within said cell and the level of such electrolyte for the proper conditioning of the battery can be determined, as hereinbefore set forth.

In Figures 4 and 5 of the drawing there is shown a slight modification of the invention, wherein the cap 27 has fitted therein the spaced pair of anodes 28 which are in series, one being electrically connected, at 29, with the bulb 30 and the electric buzzer 31, included in the circuit between the current lead 32 and the ground lead 33, and within this circuit is a switch 34 alike to the switch arm 23 and operated by a push button 35 for the completion of a circuit to both the bulb 30 and the buzzer 31 when the electrolyte 36 within the battery is at a level for the contact of the anodes 28 with said electrode and thus indication may be had both through a visible and audible signal that the proper level of electrolyte is present within the battery and in all cells thereof, the battery ground lead being indicated at 37.

It is, of course, understood that the grounding of the circuit between both the bulb 30 and the buzzer 31 and the battery is had through the frame or body of the motor vehicle.

It is obvious from the construction before described that there is provided a storage battery low level signalling mechanism in which an anode or anodes extend through the conventional filling opening and into the electrolyte in the cell of a battery, so that when a switch is closed and the electrolyte is at a normal level within the cell, both an audible and visible signal will be had to be indicative of the fact that the battery is properly conditioned or the electrolyte therein at the required level. On the lowering of the level of the electrolyte, the operator of the vehicle will have knowledge thereof because the indicator will be inactive upon the closing of the hand switch heretofore referred to. Thus full knowledge of the condition of the battery is assured without the usual inspection thereof for determining the quantity of electrolyte within the cells of the same.

What is claimed is:

An indicator of the character described, comprising a housing of two parts which are removably associated, a bracket on one of said parts for attaching the housing to a support and the second part of the housing carrying a light projecting lens and said housing having a ground wire, a metal clip in the fixed part of the housing for the metal base of an electric lamp bulb, a spring metal switch arm fixed in the housing and normally sprung from contact with the lamp base and said switch arm being wired in an electric circuit and an electrically operated audible alarm mounted in the housing and having a contact to be engaged by the switch when the said switch is moved to contact with the lamp base.

ALFRED L. LEPORE.